United States Patent
Bernard et al.

(10) Patent No.: US 6,512,350 B1
(45) Date of Patent: Jan. 28, 2003

(54) METHOD FOR CONTROLLING A BATTERY RECHARGING AND IMPLEMENTING DEVICE

(75) Inventors: Robert Bernard, Conflans Sainte Honorine (FR); Patrick Le Fichous, Saint Crepin (FR); Fernando Romao, Montesson (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/720,799
(22) PCT Filed: Jun. 25, 1999
(86) PCT No.: PCT/FR99/01532
§ 371 (c)(1),
(2), (4) Date: Mar. 21, 2001
(87) PCT Pub. No.: WO00/01051
PCT Pub. Date: Jan. 6, 2000

(30) Foreign Application Priority Data

Jun. 26, 1998 (FR) .............................. 98 08138

(51) Int. Cl.[7] .................. H01M 10/44; H01M 10/46
(52) U.S. Cl. ......................................... 320/150
(58) Field of Search ................... 320/127, 128, 320/135, 137, 150, 153

(56) References Cited

FOREIGN PATENT DOCUMENTS

| EP | 0 225 789 A | 6/1987 |
|----|-------------|--------|
| WO | WO 96/19860 | 6/1996 |

*Primary Examiner*—Edward H. Tso
(74) *Attorney, Agent, or Firm*—Pennie & Edmonds LLP

(57) ABSTRACT

In the device for controlling the recharging of a battery (2) from a current generator (1), one applies the process according to which:

Figure 1:
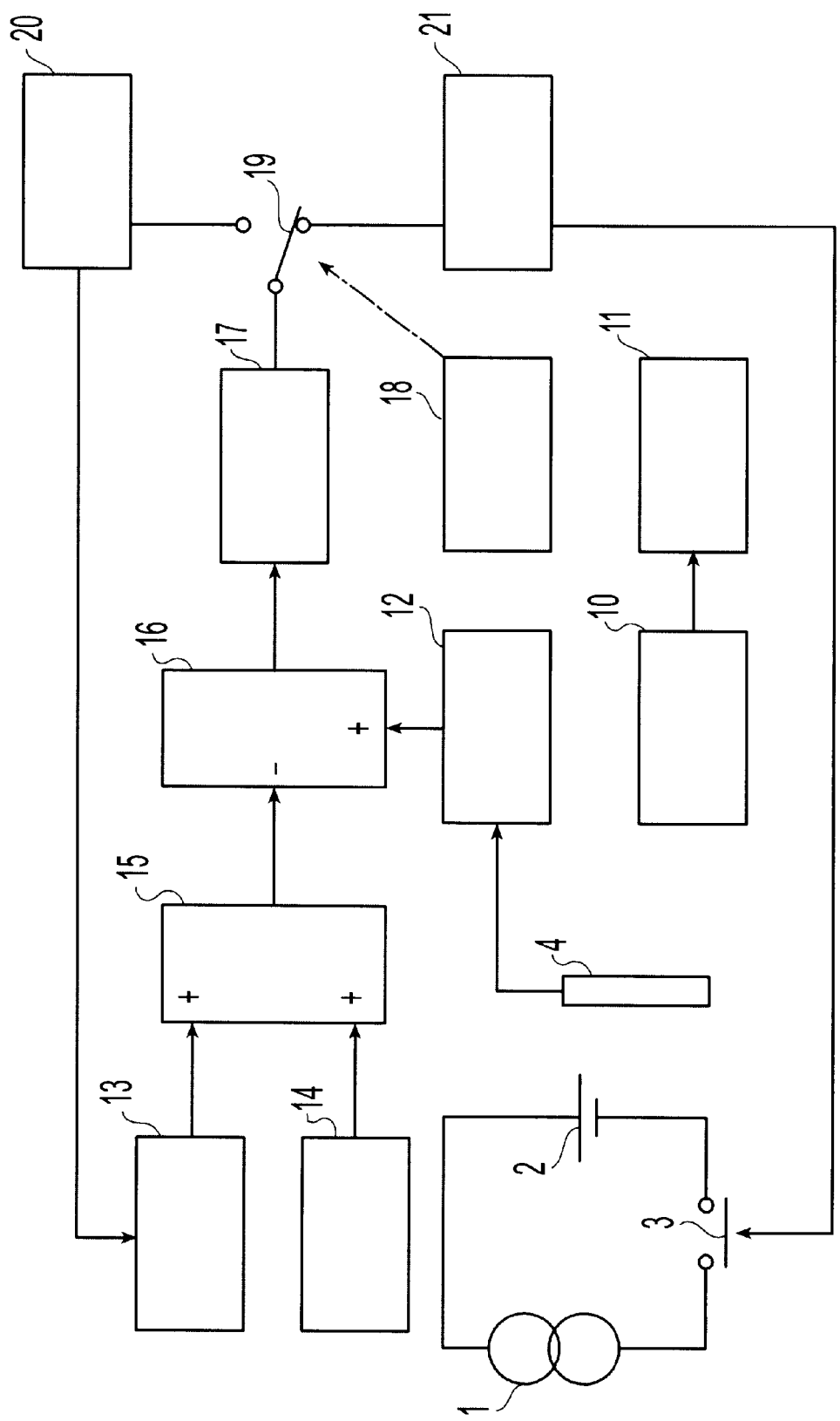

the value of the charging current is varied cyclically from an initial value, the temperature of the battery (2) is monitored so as to search for and measure therein a corresponding variation of the temperature, and the value of the current is reduced if the temperature variation exceeds a target threshold (14).

The invention applies to portable terminals.

29 Claims, 4 Drawing Sheets

METHOD FOR CONTROLLING A BATTERY RECHARGING AND IMPLEMENTING DEVICE

The present invention relates to the recharging of a battery, in particular that of a radiotelephony handset. In order to limit the weight of the handset, the use of lead batteries is avoided and preference is given for example to batteries employing Cadmium-Nickel or NiMH (Nickel Metal Hydride) technology, although they are more delicate. In order to avoid damaging them, they are recharged using a limited current, from a charger comprising a current generator.

A current generator is, by nature, designed to deliver the requisite current, regardless of the voltage of the battery. Hence, a momentarily very low battery voltage cannot cause an excessive inrush of current. However, the voltage of the battery, which rises owing to the recharging current, cannot oppose this current when the battery is recharged. The energy of the recharging current, which is normally converted into chemical energy for recharging the battery, can no longer perform this conversion when all the electrolyte has been converted and the battery is equivalent, in respect of the recharging current, to a heating resistor. The corresponding heating might therefore destroy it if it is not possible to detect the end of chemical recharging state, so as to stop the recharging current.

To detect the end of recharging, it is known practice to monitor the voltage of the battery, which increases during recharging but decreases slightly and temporarily in the transient phase during which, at the end of recharging, the battery begins to become equivalent to a heating resistor.

However, in an environment of use in an apparatus, such as the aforementioned handset, the circuits supplied by the battery are sometimes placed temporarily on standby and reactivated, so that the variations in discharge current thereby induced cause positive or negative jumps in battery voltage. Recharging might therefore be interrupted too soon or, conversely, it might never be interrupted if such a voltage jump masks the temporary fall in voltage, indicative of the end of recharging.

The applicant has contemplated monitoring the absolute level of the temperature of the battery so as to detect the changeover to the "heating resistor" mode. However, the discharge current, or else the environmental conditions of the terminal, such as exposure to the sun's rays, may also cause heating of the battery, which might wrongly be regarded as an end of recharging.

EP-A 0225 789 teaches the detecting of a maximum battery temperature so as to stop the recharging.

WO 96 19860 A teaches the measuring of the battery heating, which results from a specified current, so as to stop the recharging when the variation in heating exceeds a threshold.

The present invention aims to reliably control the recharging of a battery.

Accordingly, the invention relates firstly to a process for controlling the recharging of a battery from a current generator, in which process:

a charging current is applied to the battery is varied cyclically from an initial value, the temperature of the battery is monitored so as to search for and measure therein a corresponding variation of the temperature, and the value of the current is reduced if the temperature variation exceeds a target threshold, which process is characterized in that the value of the charging current is varied cyclically from an initial value and in that it is the corresponding temperature variation which is compared with the threshold is reduced if the temperature variation exceeds a target threshold.

Thus, the variation in current is equivalent to a succession of pulses which is manifested thermally at the battery level by a succession of thermal cycles in phase with these pulses. It is this sensitivity of conversion, or slope, between the variation in current and the variation in temperature which is thus determined so as, if need be, to bring the current to a value such that it does not, by itself, heat the battery by a value exceeding the target threshold value. The value of the ambient temperature does not intervene as such, since it may be constant, and since it is sufficient to deduct it from the temperature measurements so as to deduce therefrom the thermal variation, or since it may drift, but it is equivalent to a variable changing at a different frequency from that of the pulses, hence with no phase relationship with the pulses, this making it possible, eventually, to accurately determine their influence. It is appreciated that the process applies to any battery, be it isolated or incorporated into any type of apparatus.

Preferably, the value of the temperature variation is slaved to the threshold value by adjusting the current in accordance with the deviation between the said temperature values.

It is thus possible to recharge at the maximum current compatible with the target value.

Advantageously, the value of the temperature variation is determined by comparison between a heating slope and a cooling slope.

It is thus possible to circumvent the drifting of the ambient without having to monitor the latter since its overall effect is then zero.

The invention also relates to a device for controlling recharging of a battery configured so as to be supplied by a current charger, comprising means for providing a target threshold value of temperature variation of the battery, characterized in that it includes means of variation for varying the recharging current, sequencer means for cyclically controlling the means of variation, and means for measuring the temperature of the battery, means of calculation, linked at input to the threshold-providing means and to the temperature-measuring means so as to determine therefrom a temperature variation value and to control means of adjusting the current in accordance with the deviation between the temperature variation value and the threshold value.

Figure 2:
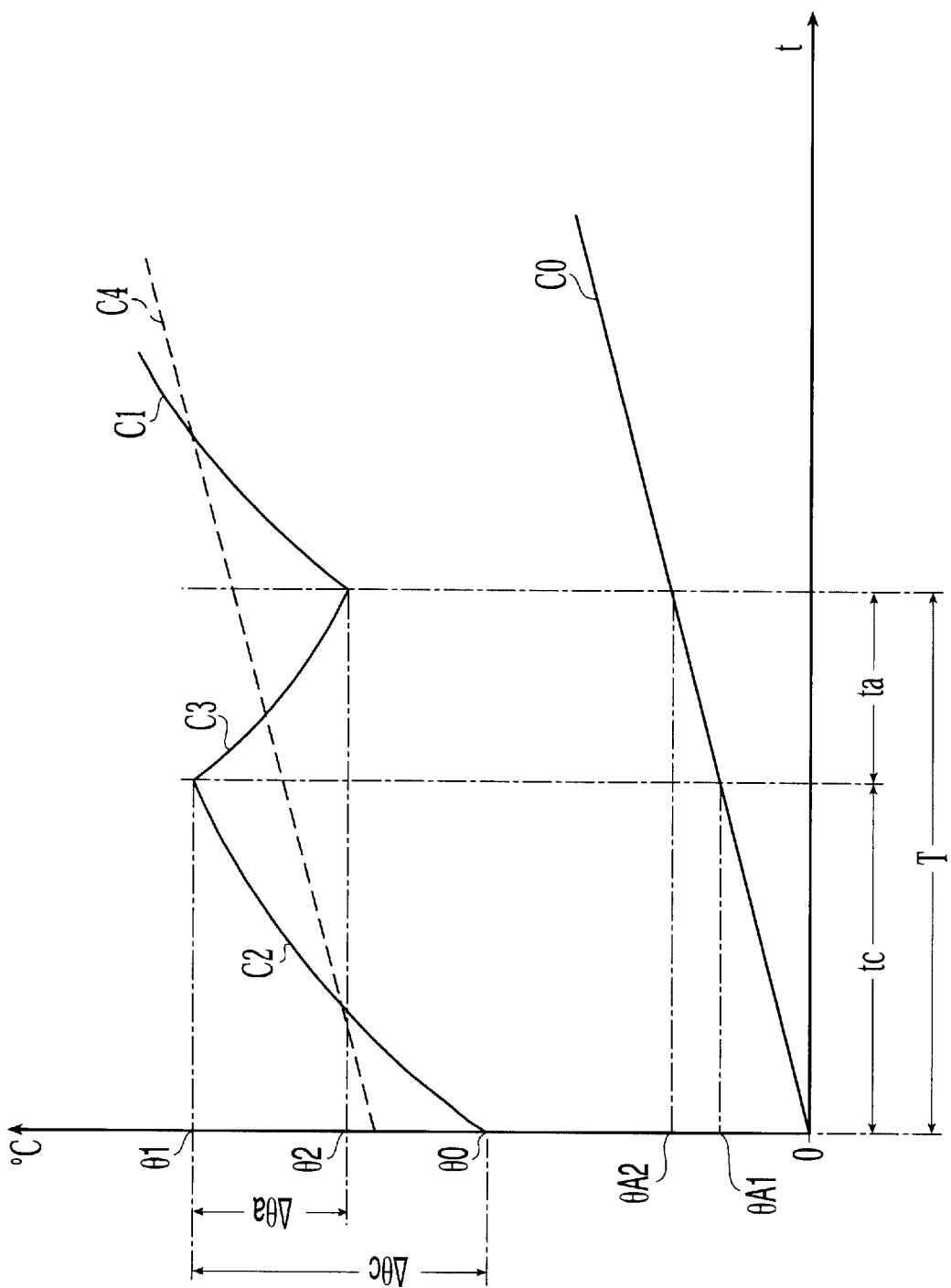
Figure 3:
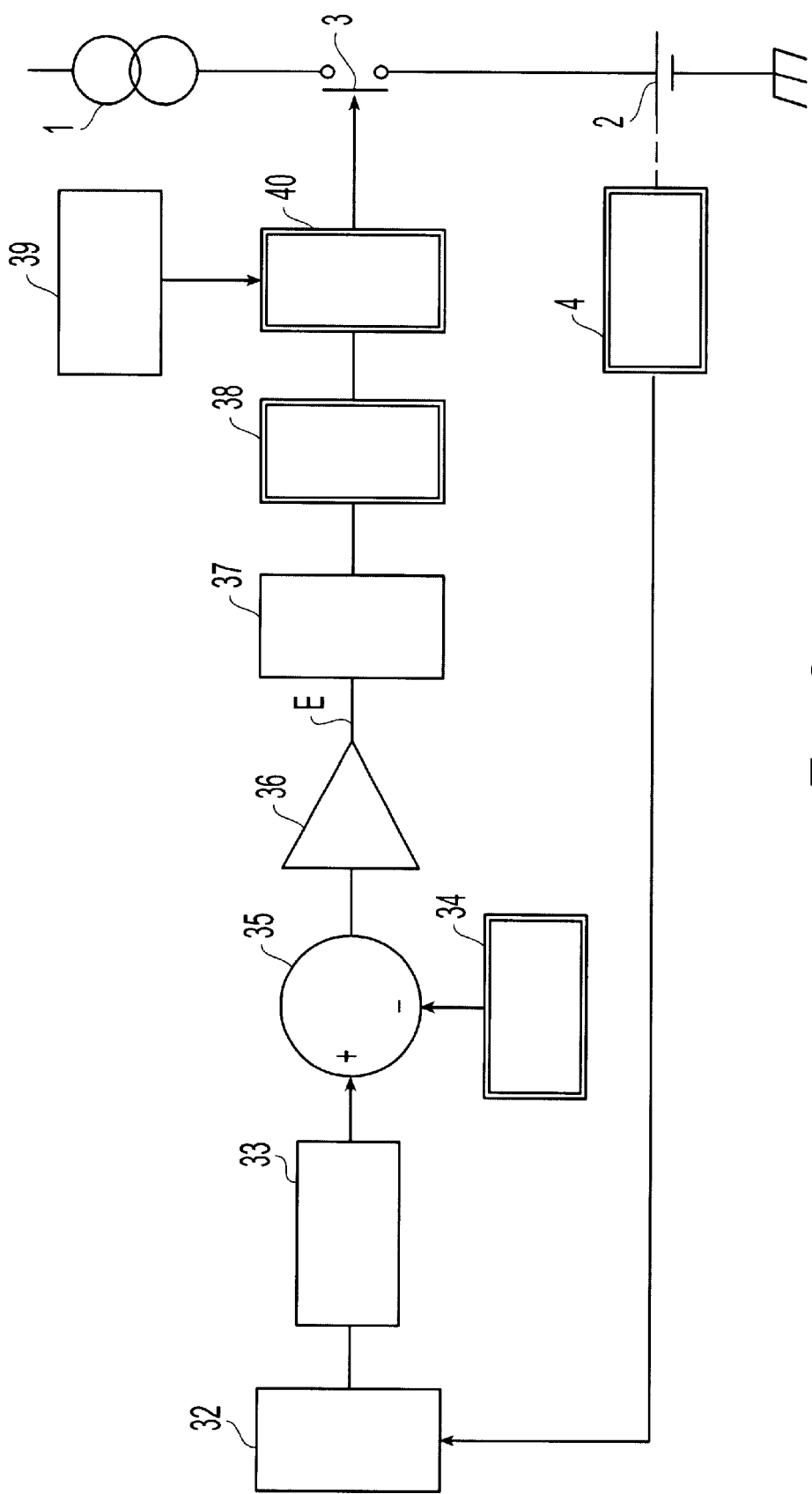
Figure 4:
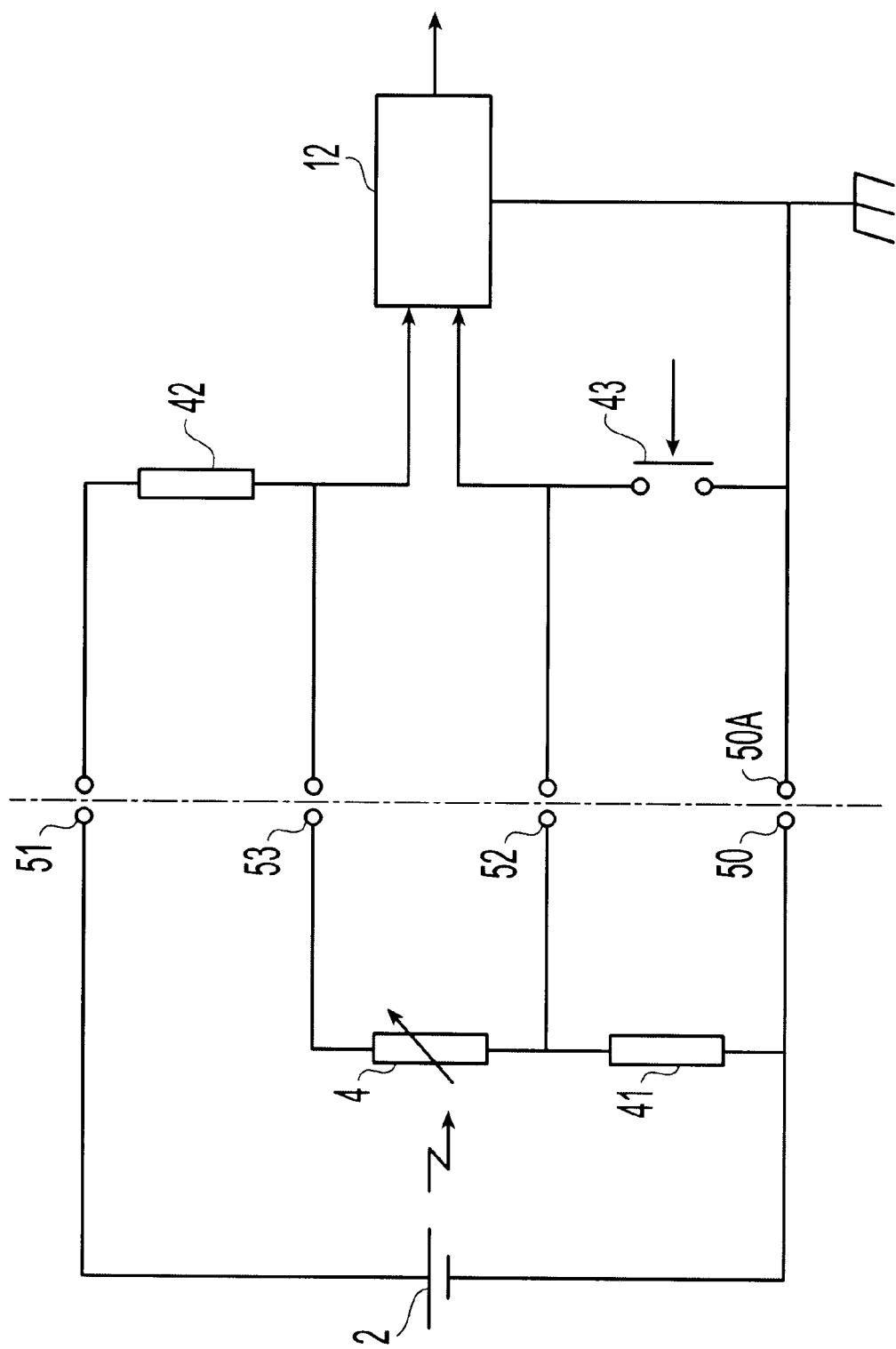

The invention will be better understood with the aid of the following description of a preferred mode of implementation of the process of the invention, with reference to the appended drawing, in which:

FIG. 1 is a functional block diagram of a radiotelephony handset implementing the process of the invention, FIG. 2 is a time chart illustrating a thermal excitation of the battery of the handset, FIG. 3 is a chart illustrating the steps of the process, and FIG. 4 is a diagram of circuits for measuring the temperature of the battery.

The radiotelephony handset represented comprises a battery 2, here of the NiMH type, in series with a breaker 3, presented in the form of a relay, for controlling the recharging current of the battery 2, originating from a current generator 1 supplied from the mains and which can be plugged into the handset via a connector.

Fixed on the battery 2 is a temperature detector 4 and, here specifically, a resistor, or thermistor, of value varying with temperature according to a known law. As a variant, it would have been possible to provide a diode, whose voltage drop, and hence whose static and dynamic resistance, varies in the opposite direction to the temperature.

A central unit with microprocessor 11, with operation clocked by a timebase 10, controls the recharging of battery 2, by operating the relay 3.

The central unit comprises at input an analogue/digital converter (ADC) 12 measuring the value of the resistor 4, for example by measuring its voltage when it is supplied with a determined current. FIG. 4 provides the detail of the measurement circuits and is commented on later. The output of the ADC 12 is linked to the positive input of a subtractor 16 receiving, on its negative input, the output of an adder 15. The adder 15 receives the output of a memory 13 providing an ambient temperature value (defined later) and the output of a memory 14 providing a value of a target threshold, limiting the temperature modulation of the battery 2 by the current from the current generator 1.

The result output by the subtractor 16 is integrated in an integrator 17, the result of which is routed, by a router 19, represented very diagrammatically by a relay blade, to a calculating block 20 or to a calculating block 21, depending on the control of the router 19, originating from a sequencer circuit 18.

The calculating block 20 calculates the value of the ambient temperature and stores it in memory 13. The expression ambient temperature is understood to mean the temperature of the battery 2 in the absence of recharging current. The ambient temperature therefore depends in particular on the temperature of the ambient air, on the temperature of any surface on which the handset is placed, on its direct exposure to the sun's rays and also on the discharge current in the telephone components, or useful charge, of the handset, which are not represented.

The calculating block 21 controls, in accordance with the output from the integrator 17, the breaker 3 so as to limit the mean recharging current to a value such that by itself it only causes heating of the battery 2 not exceeding the threshold value of the memory 14 (or a value tied to the latter, such as proportional), and does so independently of the other causes of heating. It is therefore necessary to be able to discriminate between the heating from the recharging current and that due to the other causes indicated above.

FIG. 2 illustrates the principle of the process of the invention, the temperature of the battery 2 measured (12) being plotted as ordinate and the time t as abscissa.

Curve C0 represents the profile of the ambient temperature, of the battery 2, as defined above. This temperature increases here according to a monotonic curve C0 with substantially constant slope.

Curve C1 represents the temperature of the battery 2 actually measured, that is to say the ambient temperature (C0) to which is added a positive modulation or variation due to the fact that the recharging current varies from an initial value, while being applied cyclically, according to successive periods T, to the battery 2, each time for a charging duration tc followed by a stoppage of duration ta. The battery 2 therefore receives cyclic current pulses at determined instants.

In this example, tc=10 min ta=5 min.

With respect to the ambient C0, the initial temperature θ0 (here at a given instant with the thermal regime already established) varies, over the duration tc of the first phase (curve C2), under the effect of the heating due to the recharging current, towards a top asymptotic value parallel to the curve C0. The heating perceived, which will control the regulation, is strictly speaking the difference between the heating due to the current and the natural cooling during this phase tc. The temperature variation is of exponential form, dwindling away as one approaches the asymptote. Added thereto, as absolute variation, is the drift, positive as here or else negative, of the ambient temperature C0, going from 0 (arbitrary reference) to θA1.

During the second phase ta of rest (curve C3), the thermal excitation of the battery 2 by the recharging current no longer exists and curve C3 has the "natural" curve C0 of the ambient as bottom asymptote. Curve C3 may therefore rise, if curve C0 rises sufficiently, or else, in the general case represented here, it falls back to a value θ2, the ambient temperature having then reached the value θA2. The sawtooth shape of the curves C2, C3 is repeated for the subsequent periods T.

As a first approximation, the ambient temperature C0 may be regarded, for the sake of explanation, as varying with a time constant which is much greater than the period T, that is to say the curve C0 is substantially a string of straight line segments, each period T corresponding to a segment. The period T, here 15 minutes, is however large enough, here of the order of magnitude of the thermal time constant of the battery 2, for the thermal modulation to be clearly discernible and hence measurable with good accuracy. More generally, since the profile of the ambient C0 does not exhibit any correlation with the controlled thermal modulation, the ambient merely introduces background noise into the calculations, which is filtered by repeating, or integrating, their results.

Curve C4, the mean or integral of curves C2 and C3, circumvents the instantaneous effects of the phases tc and ta and is parallel, when the regulating of the current is at equilibrium, to the ambient curve C0 and above, by Δθ. The temperature offset Δθ between curves C0 and C4 therefore corresponds to an equilibrium between the thermal excitation due to the current, during tc, and the "de-excitation" due to the ambient which then progressively absorbs the thermal overrun of the battery 2, during ta. The larger the deviation Δθ, the more effective is this shift back towards the curve C0 (slope of the exponential for the decrease in deviation). It is therefore possible to estimate Δθ according to the ensuing cooling effect which is equal, in absolute value and at equilibrium, to the thermal heating produced by the recharging current I when it flows, that is to say here according to a relative angle of flow P.

$$\text{Here: } P = \frac{tc}{T} \cdot L \tag{1}$$

with L: relative angle of flow of the current in a circuit 38 (FIG. 3) for adjusting the width of cyclic pulses of the recharging current, here having a period of much less than T, adjusting the requisite mean current so as not to exceed the heating threshold.

The thermal excitation power $RI^2 \cdot p$ (R battery resistance), or thermal heating flux, is equal to the thermal cooling flux, proportional to Δθ. Thus, at equilibrium, the heating Δθ represents the value of the resistance R.

Stated otherwise, the integral of the thermal flux due to the current during tc is equal to the integral of the cooling during ta.

We may therefore write:

$$\Delta\theta c = \theta 1 - \theta 0 = ECH + \theta A1 \quad (2)$$

and $$\Delta\theta a = \theta 2 - \theta 1 = RAP + (\theta A1 \cdot ta/tc) \quad (3)$$

since $$\theta A1/tc = (\theta A2 - \theta A1)\, ta, \quad (4)$$

with:

ECH: heating due to the recharging current, and
RAP: thermal shift back towards ambient, during ta.

In this example, different durations ta and tc have been chosen. The effects of the drifting of the ambient C0 will however be circumvented. The ambient C0, assumed to vary substantially linearly, therefore has, in the two phases tc and ta, a temperature drift effect proportional to the relevant duration tc or ta. Knowing the ratio of these two durations tc and ta, it is possible to correct the temperature measurements so as to circumvent the drifting of the ambient C0, by norming the temperature variations with respect to time:

$$\frac{\Delta\theta c}{tc} = \frac{\Delta\theta a}{ta} \quad (5)$$

so as ultimately to determine a thermal gradient per unit time, by means of a single temperature sensor (4).

Stated otherwise, the natural cooling of the battery 2, proportional to the mean heating $\Delta\theta$, compensates for the introduction of thermal energy. This introduction of thermal energy is proportional to the thermal conversion slope, or effectiveness, of the recharging current, to the square of the value I of this current and to the shape factors tc/T and L. The values I, tc/T and L being known, $\Delta\theta c$ is therefore directly indicative of the thermal sensitivity, or conversion slope, of the battery 2 with respect to the recharging current.

It is then possible to establish an estimate EST of the amplitude of the thermal modulation of the battery 2 through the modulation of the current, EST representing $\Delta\theta$ to within a factor. Starting from equation (5) and expanding according to equations (2) and (3), at equilibrium, when ECH=−RAP, we obtain:

$$EST = \Delta\theta c - \frac{tc}{ta}\Delta\theta a = ECH + \theta A1 - \frac{tc}{ta}\left[-ECH + \theta A1\frac{ta}{tc}\right] \quad (6)$$

$$= ECH\left(1 + \frac{tc}{ta}\right) = \alpha \cdot \Delta\theta = \alpha \cdot k \cdot I \cdot P$$

with:

k (° C./A): thermal sensitivity of the battery and $$\alpha = 1 + \frac{tc}{ta} = 3$$

here.

As shown by the structure of the term $\alpha$, the estimate or fictitious heating EST is a calculated value which is proportional to the actual heating value $\Delta\theta$ and represents it perfectly. It is therefore sufficient to slave the variable EST to a heating threshold value so as likewise to slave the actual heating $\Delta\theta$ to a corresponding threshold value.

The recharging current I is provided by a current generator 1, adjustment of the instantaneous current of which is not envisaged in this example. As a variant, it would have been possible to envisage static regulation by means of a series element with adjustable impedance, such as a transistor, without cutting off the current. Here, however, in order to adjust the mean current during the phases tc, the current is cut off cyclically in the circuit 38 so as to allow it through in pulses only during the fraction L of the time (relative angle of flow). Since the pulsatile current is equivalent to a direct current (mean current) on which is superimposed an alternating component, the latter can be eliminated, as therefore can the additional heating which it induces, by filtering it through a reactive element downstream of the breaker 3, such as for example a series inductor.

FIG. 3 illustrates the regulating process.

The temperature of the battery 2 being monitored and recorded continuously, or cyclically, by the sensor 4 in a step 32, the following is calculated in a step 33:

$$EST = \Delta\theta c - \Delta\theta a \cdot tc/ta$$

which, as indicated previously, amounts to comparing (subtracting) the heating slope $\Delta\theta c/tc$ and the cooling slope $\Delta\theta a/ta$. In this example, the deviation in the slopes is brought into the temperature domain by multiplying by a certain duration, here taken equal to tc. In another example, the threshold 34 could however have been expressed in the form of a thermal slope with respect to time. This value EST is compared (subtracted), in a step 35, with a threshold value originating from a memory 34 (equivalent of the memory 14). The difference obtained is amplified by a factor G in a step 36 so as to provide a utilizable error signal $\epsilon$ which is integrated in a step 37, over a sliding duration of around T, so as to provide an integrated error signal INT which controls the adjusting of the gate 38, that is to say fixes the shape factor L, or percentage of time of flow, and hence the mean current. The output from the gate 38 is applied to an input of the gate 40, another input of which receives (step 39) a fixed shape factor signal tc/T (here 2/3) originating from the sequencer 18 so as to switch off the breaker 3 during ta. The output from the gate 40 controls the breaker 3 and hence the mean recharging current I.L during the phase tc.

A loop for regulating the rise in the temperature of the battery 2 is thus constructed, circumventing the variations in the ambient.

If the formula serving to estimate the temperature rise were otherwise and exhibited some sensitivity to the drifting of the ambient, it would be possible to envisage measuring the latter cyclically, by stopping all excitation (tc) for one or more periods T, so as to revert substantially and temporarily to the curve C0. In practice, this can be achieved, in the example detailed, by temporarily forcing the target value (14; 34) to zero.

To likewise detect an abrupt drift in the ambient temperature, the calculating block 21 could be designed to include a comparator for comparing, with an alarm threshold, the deviation ($\epsilon$ or INT) between the measured temperature modulation and the target value and for controlling an ambient temperature measurement cycle if the deviation exceeds the threshold.

By virtue of the process of the invention, it is thus possible to reduce the value of the current (reduction in the shape factor F) if the temperature modulation exceeds the target threshold.

Preferably, the value of the temperature modulation is slaved, as explained, to the threshold value, so that the current holds a maximum value, allowing rapid recharging, but remaining compatible with the temperature rise threshold. The shape factor F may therefore also increase temporarily, if for example the telephone circuits of the terminal discharge the battery 2.

The diagram for measuring the temperature of the battery 2 is represented in FIG. 4. The battery 2 bears a resistor 41 of value specific to the type of battery considered and serving to identify this type. It also bears the resistor 4, here consisting of a resistor with known negative temperature coefficient (NTC), which coefficient is stored in the central unit. The battery block ought therefore in principle to include, apart from a pair of supply terminals 50 and 51, two pairs of measurement terminals for the resistors 4 and 41, so as to link them to respective circuits with ohmmeter function. Here, however, the battery block comprises only four terminals, that is to say two measurement terminals 52 and 53 in addition to the pair of supply terminals 50 and 51. For this, the resistors 4 and 41 are mounted in series and the dipole thus constructed is linked, on one side, to one of the supply terminals, here earth 50, and, on the other side, to the measurement terminal 53. The midpoint of the dipole is linked to the other measurement terminal, 52. In this example, it is resistor 41 which is linked to the earth terminal 50.

In the handset proper, the measurement terminal 53 is linked to the positive supply (terminal 51) by a resistor 42 for supplying current to the dipole 4, 41. A strictly constant current generator could have been provided instead of the resistor 42.

A breaker 43, here an analogue gate represented in the form of a relay contact, makes it possible to link the terminal 52 to earth under a low impedance, of a few tens of ohms.

The A/D converter 12, referenced to earth serving as reference, is linked at input to the terminal 53 and also, by another input, to the terminal 52.

The above circuits operate as follows:

For a phase (a priori solely initial) of identification, with storage, of the type of battery 2, the ADC 12 measures the voltage across the terminals of the resistor 41. Here, the latter has a value of 10 kohms, as does the resistor 42, the NTC resistor, 4, here having a considerably lower value of a few hundred ohms. Hence, a value slightly below 6 volts is measured for a battery 2 of nominal value 12 volts. By comparison with a table of a plurality of reference voltages, or identification voltages, the central unit deduces therefrom the type of the battery 2, that is to say keeps the type whose reference voltage is closest to that measured. This identification makes it possible for example to determine the maximum allowable recharging current during the chemical recharging phase and to limit the shape factor L accordingly.

The various reference values, of limited number, are sufficiently distinct from one another to tolerate the scatter in battery voltage, the scatter in value of the resistor 41 and the electrical noise. This noise stems in particular from the variations in the useful current of the battery 2 across the parasitic resistance of the contact between the terminal 50 and a counterpart earth terminal 50A of a housing of the casing of the handset reserved for the battery 2, the dashed line indicating the boundary (four-point connector) of this housing. The resistor 41 is also a source of noise.

Since here the resistor 41 is of low value relative to the resistor 41, there could even be provision to measure the voltage of the terminal 53, hence therefore slightly above 6 volts. The terminal 52 would then be unnecessary in this phase and the converter 12 would have just one input.

Thus, to fix a maximum allowable value of the recharging current:

a resistor 41, of value specific to the battery 2, is mounted in series with the current supply circuit 42 to form a divider bridge which is supplied from the battery 2, the voltage of the midpoint of the divider bridge is measured and the maximum current is deduced from this, by consulting a pre-established table.

For a phase of measuring the temperature of the battery 2, the voltage of the terminal 53 of the NTC resistor 4 is measured by earthing the breaker 43. The sensitivity of the ADC 12 can be increased here so as to compensate for the attenuator effect due to the low value of the NTC 4. The resistor 42, here of much higher value, provides an almost constant current, so that the voltage of the terminal 53, and its variation with temperature, conveys, substantially linearly, the variation in resistance of the NTC 4, whose temperature dependency curve is stored. However, if the current were to vary with the value of the NTC 4, the above curve would be corrected accordingly. The NTC 4 is thus temporarily linked under low impedance, by the breaker 43, to an earth which is specific thereto and which virtually short-circuits the electrical noise stemming from the contact 50, 50A across the resistor 41 of high value. The noise divider bridge 43-41 thus isolates the resistor 4 in relation to the above noise generator. Furthermore, it is possible to perform a differential measurement between the two inputs (52, 53) of the ADC 12, so as to eliminate the influence of the parasitic resistance of the breaker 43.

It will be observed that, as far as the limited Anumber of terminals of the battery 2 is concerned, there is nothing preventing the resistor 42 and even the breaker 43 from being installed on the battery 2, or, conversely, the thermistor 4 from being integral with the housing and accessible to the body of the battery 2.

Thus, to determine the temperature of the battery 2, the resistive element 4 of temperature-sensitive value is interposed in series, in the middle of the divider bridge, and it is coupled thermally with the battery 2, the identification resistor 41 is short-circuited through a link of reference potential, 50A, the voltage is measured of a terminal 53 of the resistive element 4, which terminal is opposite the other terminal 52 at the reference potential, and the temperature of the resistive element 4 and hence of the battery 2 is deduced from this, by consulting a pre-established table.

Thus, in this diagram, the mounting of the two resistors 4 and 41, in the same series circuit, with no galvanic isolation between them, makes it possible to supply them from a common terminal, the single terminal 53, and the breaker 43 makes it possible to re-establish when need be, the requisite alternative isolation (lost through the disappearance of the galvanic isolation) between the earth contact 50, 50A and the variable resistor 4. A series galvanic cutout is thus replaced by a parallel short-circuit.

What is claimed is:

1. A process for controlling the recharging of a battery from a current generator, the process comprising:

applying a charging current to the battery;

monitoring the temperature of the battery so as to search for and measure a temperature variation; and reducing the value of the charging current if the temperature variation exceeds a target threshold;

wherein the value of the charging current is varied cyclically from an initial value, wherein the corresponding temperature variation is compared with the target threshold, and wherein the value of the temperature variation is determined by comparison between a heating slope and a cooling slope.

2. A process for controlling the recharging of a battery from a current generator, the process comprising:
   applying a charging current to the battery;
   monitoring the temperature of the battery so as to search for and measure a temperature variation; and
   reducing the value of the charging current if the temperature variation exceeds a target threshold;
   wherein the value of the charging current is varied cyclically from an initial value,
   wherein the corresponding temperature variation is compared with the target threshold, and
   wherein the amplitude of the temperature variation is determined by comparison between the measured temperature of the battery and the ambient temperature (C0).

3. The process according to claim 2, wherein recharging is temporarily interrupted so as to measure the ambient temperature (C0).

4. The process according to claim 3, wherein the ambient temperature (C0) is measured when the measured temperature variation tends to deviate from the target threshold.

5. The process according to claim 3, wherein the ambient temperature (C0) is measured by temporarily forcing the target value to zero.

6. The process according to claim 2, wherein the amplitude of the temperature variation is determined by calculating the sum of the ambient temperature and of the value of the target threshold and subtracting the measured temperature.

7. The process according to claim 6, wherein the result of the calculation is integrated over a specific duration.

8. A process for controlling the recharging of a battery from a current generator, the process comprising:
   applying a charging current to the battery;
   monitoring the temperature of the battery so as to search for and measure a temperature variation; and
   reducing the value of the charging current if the temperature variation exceeds a target threshold;
   wherein the value of the charging current is varied cyclically from an initial value,
   wherein the corresponding temperature variation is compared with the target threshold, and
   wherein the value of the mean current is adjusted by letting the current flow for a variable percentage of the time.

9. A process for controlling the recharging of a battery from a current generator, the process comprising:
   applying a charging current to the battery;
   monitoring the temperature of the battery so as to search for and measure a temperature variation; and
   reducing the value of the charging current if the temperature variation exceeds a target threshold;
   wherein the value of the charging current is varied cyclically from an initial value,
   wherein the corresponding temperature variation is compared with the target threshold, and
   wherein to fix a maximum allowable value of the recharging current:
      a resistor, of value specific to the battery, is mounted in series with a current supply circuit to form a divider bridge which is supplied from the battery,
      the voltage of the midpoint of the divider bridge is measured and
      the maximum current is deduced from this, by consulting a pre-established table.

10. The process according to claim 9, wherein to determine the temperature of the battery,
    a resistive element of temperature-sensitive value is interposed in series, in the middle of the divider bridge, and it is coupled thermally with the battery,
    the identification resistor is short-circuited through a link of reference potential,
    the voltage is measured of a terminal of the resistive element, which terminal is opposite another terminal at the reference potential, and the temperature of the resistive element and hence of the battery is deduced from this, by consulting a pre-established table.

11. The process according to claim 8, wherein the value of the temperature variation is determined by comparison between a heating slope and a cooling slope.

12. The process according to claim 8, wherein the amplitude of the temperature variation is determined by comparison between the measured temperature of the battery and the ambient temperature (C0).

13. The process according to claim 1, wherein the amplitude of the temperature variation is determined by comparison between the measured temperature of the battery and the ambient temperature (C0).

14. The process according to claim 4, wherein the ambient temperature (C0) is measured by temporarily forcing the target value to zero.

15. The process according to claim 3, wherein the amplitude of the temperature variation is determined by calculating the sum of the ambient temperature and of the value of the target threshold and subtracting the measured temperature.

16. The process according to claim 4, wherein the amplitude of the temperature variation is determined by calculating the sum of the ambient temperature and of the value of the target threshold and subtracting the measured temperature.

17. The process according to claim 5, wherein the amplitude of the temperature variation is determined by calculating the sum of the ambient temperature and of the value of the target threshold and subtracting the measured temperature.

18. The process according to claim 1, wherein the value of the mean current is adjusted by letting the current flow for a variable percentage of the time.

19. The process according to claim 1, wherein to fix a maximum allowable value of the recharging current:
    a resistor, of value specific to the battery, is mounted in series with a current supply circuit to form a divider bridge which is supplied from the battery,
    the voltage of the midpoint of the divider bridge is measured and the maximum current is deduced from this by consulting a pre-established table.

20. A device for controlling recharging of a battery configured so as to be supplied by a current charger, the device comprising:
    means for measuring the temperature of the battery;
    means for providing a target threshold value of temperature variation of the battery;
    means of variation for varying the recharging current;
    sequencer means for cyclically controlling the means of variation; and
    means of calculation, linked at input to the threshold-providing means and to the temperature-measuring means so as to determine therefrom a temperature variation value and to control means of adjusting the current in accordance with the deviation between the temperature variation and the threshold value.

21. The device according to claim 20, wherein the means of adjustment include a series element for controlling cyclic flow of current pulses of adjustable duration.

22. The device according to claim 20, wherein the calculating means include a summator circuit configured so as to receive the measured temperature value, to add thereto the threshold value and to deduct therefrom an ambient temperature value and to control accordingly an integrator circuit for calculating the temperature variation.

23. The device according to claim 22, wherein the integrator circuit controls a circuit for determining the mean charging current, controlling the means of adjustment.

24. The device according to claim 22, wherein the integrator circuit controls a circuit for calculating the ambient temperature.

25. The device according to claims 22, wherein the calculating means include comparator means for comparing, with a threshold, the deviation between the measured temperature modulation and the target value and for controlling an ambient temperature measurement cycle if the deviation exceeds the threshold.

26. The device according to claim 21, wherein the calculating means include a summator circuit configured so as to receive the measured temperature value, to add thereto the threshold value and to deduct therefrom an ambient temperature value and to control accordingly an integrator circuit for calculating the temperature variation.

27. The device according to claim 23, wherein the integrator circuit controls a circuit for calculating the ambient temperature.

28. Device according to claims 21, wherein the calculating means include comparator means for comparing, with a threshold, the deviation between the measured temperature modulation and the target value and for controlling an ambient temperature measurement cycle if the deviation exceeds the threshold.

29. A device for controlling recharging of a battery configured so as to be supplied by a current charger, the device comprising:
  a sensor for measuring the temperature of the battery;
  a memory for providing a target threshold value of temperature variation of the battery;
  means of variation for varying the recharging current;
  a sequencer for cyclically controlling the means of variation; and
  a calculating circuit, linked at input to the memory and to the sensor so as to determine therefrom a temperature variation value and to control means of adjusting the current in accordance with the deviation between the temperature variation and the threshold value.

* * * * *